US012761002B2

(12) United States Patent
Morag et al.

(10) Patent No.: US 12,761,002 B2
(45) Date of Patent: Oct. 13, 2026

(54) MODULAR CAMOUFLAGE SYSTEM AND USES THEREOF

(71) Applicant: Ametrine Technologies Ltd., En Hahoresh (IL)

(72) Inventors: Elad Morag, En Hahoresh (IL); Uria Kaplan, En Hahoresh (IL)

(73) Assignee: Ametrine Technologies Ltd., Ein Hahoresh (IL)

( * ) Notice: Subject to any disclaimer, the term of this patent is extended or adjusted under 35 U.S.C. 154(b) by 204 days.

(21) Appl. No.: 18/162,739

(22) Filed: Feb. 1, 2023

(65) Prior Publication Data

US 2023/0296356 A1 Sep. 21, 2023

(30) Foreign Application Priority Data

Mar. 20, 2022 (IL) ........................................ 291528

(51) Int. Cl.
*F41H 3/02* (2006.01)
*B32B 3/10* (2006.01)
(Continued)

(52) U.S. Cl.
CPC ............ *F41H 3/02* (2013.01); *H01Q 17/008* (2013.01); *B32B 3/10* (2013.01); *B32B 3/28* (2013.01); *B32B 5/024* (2013.01); *B32B 17/10403* (2013.01); *B32B 17/10633* (2013.01); *B32B 2255/02* (2013.01); *B32B 2307/304* (2013.01); *B32B 2307/412* (2013.01); *B32B 2307/414* (2013.01); *B32B 2307/416* (2013.01);
(Continued)

(58) Field of Classification Search
None
See application file for complete search history.

(56) References Cited

U.S. PATENT DOCUMENTS 3,661,689 A 5/1972 Spanier
4,953,922 A * 9/1990 Granqvist ........... H01Q 17/005
359/360

(Continued)

FOREIGN PATENT DOCUMENTS

CN 114179466 A 3/2022
GB 2210077 A 6/1989

(Continued)

OTHER PUBLICATIONS

International Search Report and Written Opinion dated May 10, 2023 for PCT/IL2023/050109 filed Feb. 1, 2023.

(Continued)

*Primary Examiner* — Laura C Powers
(74) *Attorney, Agent, or Firm* — Banner & Witcoff, Ltd.

(57) ABSTRACT

Multispectral camouflage systems, apparatuses, and methods describes herein may include an assembled array of one or more discrete camouflage units, wherein each of the one or more discrete camouflage units includes a composite material having at least one predetermined structurally related property and at least one predetermined camouflage-related property, and wherein each of the one or more discrete camouflage units is joined to one or more neighboring unit to provide a laterally positioned camouflage cover configured to conceal an object from visible detection, infrared detection, thermal imaging, and radar detection.

20 Claims, 4 Drawing Sheets

(51) Int. Cl.

| | |
|---|---|
| ***B32B 5/02*** | (2006.01) |
| ***B32B 17/10*** | (2006.01) |
| ***H01Q 17/00*** | (2006.01) |
| *B32B 3/28* | (2006.01) |

(52) U.S. Cl.

CPC ... *B32B 2307/418* (2013.01); *B32B 2307/714* (2013.01); *B32B 2307/73* (2013.01); *B32B 2309/027* (2013.01); *B32B 2309/12* (2013.01); *B32B 2571/02* (2013.01)

(56) References Cited

U.S. PATENT DOCUMENTS

| | | | | |
|---|---|---|---|---|
| 8,846,179 | B2 * | 9/2014 | Saucedo | F41H 3/02 428/156 |
| 2005/0118402 | A1 * | 6/2005 | Henderson | F41H 3/00 428/209 |
| 2010/0007169 | A1 * | 1/2010 | Nguyen | B60J 11/06 296/136.07 |
| 2010/0028603 | A1 * | 2/2010 | Sharp | A42B 1/004 428/151 |
| 2011/0151191 | A1 * | 6/2011 | Cincotti | F41H 3/02 428/152 |
| 2019/0017785 | A1 * | 1/2019 | Morag | C03C 17/06 |
| 2020/0056861 | A1 * | 2/2020 | Hulst | F41H 3/00 |
| 2021/0071994 | A1 * | 3/2021 | Jacobsson | G09F 21/048 |

FOREIGN PATENT DOCUMENTS

| | | | |
|---|---|---|---|
| IL | 215717 | A | 10/2017 |
| IL | 256666 | A | 4/2018 |
| WO | 2012169954 | A1 | 12/2012 |

OTHER PUBLICATIONS

Notice of Deficiencies for IL Application 291528 dated Sep. 11, 2022.

ILPO Search Report for IL Application 291528 dated Sep. 8, 2022.

* cited by examiner

MODULAR CAMOUFLAGE SYSTEM AND USES THEREOF

CROSS-REFERENCE TO RELATED APPLICATIONS

This application claims priority to Israeli Patent Application Number 291,528, filed on Mar. 20, 2022, the contents of which are incorporated by reference herein in their entirety.

TECHNOLOGICAL FIELD

Aspects of the present disclosure generally relate to systems, methods, and apparatuses for producing a camouflage system effective for thermal, visual and electromagnetic spectral ranges.

BACKGROUND

Camouflage is used for concealing an object or a person from a variety of detection means during the daytime and/or night hours. Visual as well as thermal and electromagnetic camouflage exploits the use of different colors, materials, textures and/or patterns to conceal an object, rendering it more difficult to be detected or recognized. Most of the technologies available to date concern concealment of objects in two-dimensional (2D) covers. These covers exhibit visibility-related attributes that mimic those of the background that surrounds the camouflaged object, causing the latter to blend with its surrounding background so that it is not detectable by the observer. However, 2D camouflage technologies lack an independent structural support, and as such rely on the object itself to serve as their physical chassis. This is often hard to realize, as the cover has to adjust itself to fit closely the contour map of the camouflaged object.

GENERAL DESCRIPTION

The present disclosure provides a modular camouflage system constructed of discrete units, wherein each unit comprises a functional layer that provides the camouflage related features and is built onto a structural element that provides the unit with an independent structural support. The units are structured to follow a contour map of an object section they are designed to cover. As such, upon their fusion they provide a complete object-specific camouflage system. Thus, systems according to aspects of the present disclosure are, by their nature, customizable, as they can be tailored to fit any 3D object and follow the contour map of its external surface. Moreover, such systems enable each unit of the camouflaged systems to be endowed with a specific set of camouflage related and structural related features that are tailored for its needs.

As used herein, the "camouflage system" refers to a coating that is configured to cover, dress or coat an external surface of an object to be concealed. The camouflage system may have a contour that substantially fits that of the external surface of the object, and defines the structural configuration and the arrangement of the plurality of discrete units that are assembled and fused together to provide a continuous 3D camouflage coating. As will be further discussed hereinbelow, the camouflage system may include a plurality of camouflage profiles provided by the plurality of discrete units, such that the camouflage characteristics may vary along the surface of the object.

The camouflage system may be formed of a shape that is substantially the shape of the external surface, or contour map of the object. The contour map, being a representation of the detailed external shape (contour) of the object to be camouflaged, may be determined prior to constructing the camouflaged system according to aspects of the present disclosure. Mapping may be achievable by a variety of scanning techniques including, for example, laser scanning and acoustic scanning, and others, or by relying on a contour map provided by the object manufacturer.

Thus, aspects of the present disclosure provide a camouflaged object having at least a region of its external surface covered or coated or associated or replaced with a multi-spectral camouflage system comprising an assembled array of one or more discrete camouflage units, wherein each of the one or more discrete units includes a composite material having at least one predetermined structurally related property and at least one camouflage-related property, and wherein each of the one or more discrete units is joined to or conjugated with or fixed to one or more of its neighboring units to provide a continuous camouflage cover on the 3D object, e.g., for concealing the camouflaged object from visible detection, infrared detection, thermal imaging and/or radar detection.

The present disclosure further provides a continuous multispectral camouflage system comprising an assembled array of one or more discrete camouflage units, wherein each of the one or more discrete units includes a composite material having at least one predetermined structurally related property and at least one camouflage-related property, and wherein each of the one or more discrete units is joined or conjugated or fixed to one or more of its neighboring units to provide the continuous laterally positioned camouflage cover, e.g., for concealing an object from visible detection, infrared detection, thermal imaging and/or radar detection.

Aspects of the present disclosure further provide a camouflaged 3D object having its external surface covered or coated or associated with or replaced by a camouflage cover comprising an array of one or more discrete camouflage units, wherein each unit in the array is a discrete segment of a composite material individually designed to cover a specific section of the camouflaged object (herein the exoskeleton configuration or exoskeleton assembly), or wherein each unit in the array is a tile unit being of a composite material assembled across the camouflaged object (herein the mosaic configuration or mosaic assembly). Each of the segment or tile units may have at least one camouflage-related property.

In the exoskeleton assembly, the camouflage discrete units may be provided as pre-shaped and sized composite segments that are assembled and joined together on the surface of the object, or which are structured and/or assembled to replace a section or an element of the object to be concealed. The size and more so the shape of the segments may be structured to fit a shape and size of a section of or on the external surface of the object the segments are intended to cover. Thus, each discrete segment may be molded or pre-shaped and optionally sized based on the contour map of the section of the camouflaged object they are designed to cover or replace. Each segment may be formed of a composite material structured of base layers and functional layers, as defined, wherein the base layers serve as the physical chassis onto which the functional layers is implemented.

Adjoining segments may be laterally joined or conjugated together in the assembled camouflage system or camouflage cover, side-by-side, not one on top of the other, such that the segments boundaries may meet to provide the continuous system or cover. The joining may be achievable by any suitable chemical or physical means, including adhesives, hooks, quick release elements such as Velcro® fasteners, by using a restructured frame, by use of a net, or by any other means.

By virtue of the fact that the camouflage system or camouflage cover is constructed of separate discrete pre-shaped segments joined or conjugated or assembled together to provide a complete camouflage system or cover, the exoskeleton assembly may inherently be modular. The features of both the exoskeleton assembly and the functional layer assembly of each segment may be location dependent. In other words, the composite material and thus the performance of each segment may be tuned to be optimized for the section of the object it is designed to cover. Thus, the performance of each segment of the camouflage system may be optimized to its specific role in the performance of the system as a whole.

Unlike the exoskeleton assembly, in the mosaic assembly, the system may be constructed of discrete tiles which are either randomly pre-shaped or are of a variable size which enables complete coverage of the object surface. In either case, and without wishing to be limiting, the size and shape of the mosaic tiles may be rather similar, or a finite number of mosaic tile sizes and shapes may be used, such that a combination of mosaic tiles may fit to any surface contour, enabling a 3D mosaic that is laterally attached piece by piece to the external surface of the object. Each tile may be constructed of a base layer(s) and a functional layer(s) and may be sufficiently malleable or flexible to be shaped by fitting it to the surface of the object, e.g., by an adhesive or other means, so as to follow its contour features. As mosaic pieces, they may be cut in different shapes and sizes from large planar sheets. In some cases, the sheets may be fabricated on top of metallic, e.g., aluminum, planar boards by employing a procedure that is used to fabricate segments of the exoskeleton assembly. Upon completion of the fabrication process, each sheet may be lifted-off from its respective board and cut into tiles of different shapes and sizes to form the pieces of the mosaic.

When the camouflage system or cover is built of segments, each of the segments may be formed of at least one shape and size selected to intimately fit a surface section or a detail of the 3D object and may be of a composite material that endows at least one camouflage-related property suitable for the surface feature, wherein the one or more segments may then be assembled into a continuous camouflaged surface. In a similar way, when the camouflage system or cover is built of tiles, each of the tiles may be of at least one shape and size, and may have at least one camouflage-related property, selected so that the entire collection of the tiles may be assembled to form a mosaic-like continuous camouflaged cover.

The 3D object to be camouflaged may include a nonliving object, e.g., a vehicle. The object may be any 3D object which concealment by a camouflage system of the present disclosure is desired. The 3D object may have a 3D external surface with surface topography defining a contour map. To fully coat the 3D external surface of the 3D object, attending to any detail of the contour map, the camouflage units may be configured, shaped or sized to enable intimate surface coating. As used herein, the expression “intimately fit a surface detail” or any surface feature or element refers to the tailoring, i.e., shaping and sizing of each of the camouflage discrete units (segments or tiles) such that any detail of the surface topography, i.e., surface curvature, extension, rise, depression, etc. or any extension or appendant to the surface, is covered with segments or tiles that follow the 3D surface topography to provide a continuous coating.

The 3D object, or object, may be any civilian or military object, which may include a vehicle or a stationary object. The vehicles may be selected amongst land vehicles, maritime vehicles, railed vehicles and aircrafts. Non-limiting examples include wagons, bicycles, motorcycles, cars, trucks, buses, trains, trams, ships, boats, underwater vehicles, amphibious vehicles, drones, airplanes, helicopters, aerostats and others.

The camouflage discrete segments or tiles assembled into a continuous camouflaged surface or cover need not be of the same shape and size. In fact, to afford a 3D cover that is intimate with the external surface of the object, some of the segments or tiles may not be flat or square in shape. Each unit however may have a unit boundary that is shaped to match a boundary of a neighboring segment or tile such that a 3D array of segments or tiles is formed, resulting in the camouflaged system. The segments or tiles may be arrayed such that at least part of each boundary is in contact with a boundary of a neighboring segment or tile, or in some cases, to avoid mismatch between the segments or tiles, the segments or tiles may be arrayed to partially overlap.

Each segment or tile may be defined or characterized or may be selected to adopt at least one visual, thermal, electromagnetic or stealth-related (anti-radar) property, including partial absorption of electromagnetic radiation at the frequencies of radar beams and/or 3D patterning of the external surface of the segment or tile for diverting an incident radar beam from being returned to its transmission point. The camouflage and stealth-related property may be any one or more of emissivity at visual and IR wavelengths, full or partial blocking of IR emitted by the camouflage object, and adjusting a ratio between scattering and specular reflection of light incident on the external surface of the camouflage object.

As used herein, the term “multispectral” refers to the ability of the camouflage system or cover of the invention in providing object concealment from detection across a broad range of wavelength bands in the electromagnetic spectrum. Such range of wavelengths may include the visual wavelengths (between 380 and 700 nm), short infrared (between 700 nm and 3 μm), thermal infrared (between 3 μm and 8 μm), long infrared (between 8 μm and 15 μm), far infrared (between 15 μm and 1 mm) and microwave (between 1 mm and 1 m). The multispectral capabilities thus allow concealment from detection by visual inspection (such as eyes, magnifying tools, cameras, etc.), image intensifiers, heat-seeking devices and thermal imaging sensors, and radar.

Thus, in some embodiments, the assembled array of one or more discrete camouflage units or each of the camouflage units, independently of the other, may have a camouflage and stealth-related property that may be any one or more of emissivity at visual and IR wavelengths, full or partial blocking of IR emitted by the camouflage object, and adjusting a ratio between scattering and specular reflection of light incident on the external surface of the camouflage object.

In some embodiments, the assembled array of one or more discrete camouflage units or each of the camouflage units, independently of the other, may provide emissivity at visual and IR wavelengths.

In some embodiments, the assembled array of one or more discrete camouflage units or each of the camouflage units, independently of the other, may provide full or partial blocking of IR emitted by the camouflage object.

In some embodiments, the assembled array of one or more discrete camouflage units or each of the camouflage units, independently of the other, may be characterized by a predefined ratio of scattering and specular reflection of light incident on the external surface of the camouflage object.

By selecting the composite materials from which each unit is made, each unit may adopt at least one camouflage and/or stealth-related property/properties that makes the particular unit suitable for a location or a site or a locality on the surface of the object requiring said at least one property.

In more general terms, the discrete units may be derived from sheets of heterogeneous material composites, as defined herein, which may be sized and shaped as needed to meet a structural or camouflage-related property. The sheets may be multilayered structures compressed together to provide a continuous composite. The multilayered composite may thus be formed from a plurality of material sheets that are pressed together, typically having a base exoskeleton part, which endows the sheet and any unit derived therefrom with a selected robustness, and a functional part. Thus, each camouflage discrete unit used in the construction of a camouflage system for a 3D object may include (i) a base layer(s) or an exoskeleton layer(s), acting as an internal layer of the camouflage system, and predominantly providing the structure-related properties; and (ii) a functional layer(s) which acts as the external layer(s) in a system or cover and which predominantly provides the camouflage-related and/or stealth related properties.

As demonstrated herein below, both the base layer and the functional layer assemblies may include structural multilayered composites of stacked material layers or strata, which subsequent to their fabrication, as disclosed herein, are inseparable. Each of the layers or strata of the base layer(s) and of the functional layer(s) contributes to one or more structural and functional properties of the camouflage cover, including mechanical properties, optical properties, thermal properties, electromagnetic properties, visual properties, stealth-related properties, etc. In other words, each of the one or more discrete units may be derived from the same or different layering materials or may be characterized by the same or different layering sequence and thus be of the same or different composite material, exhibiting identical or dissimilar structural and camouflage properties. The variation in composite composition and layering in concert with variation in structure, i.e., shape and size, camouflage and stealth properties, provides the ability to tailor camouflage cover to any 3D object that is fully continuous on the object surface. Furthermore, due to the fact that the camouflage system or cover is inherently modular, the camouflage system or cover may be imparted with preplanned spatial arrangement or unit distribution, and thus a preplanned stealth and structural related properties so that the performance of each of the units is optimized for the needs of the respective section of the camouflaged object it is designed to cover.

The base layer of either the discrete units in the exoskeleton configuration or the mosaic configuration may include one or more supporting strata, optionally hardened fabric strata. In some embodiments, one or more strata of fabric sheets may be adhered together, e.g., utilizing mixtures of resins and other ingredients (e.g., chopped fibers, carbon flakes or glass micro-balloons), to thereby achieve an assembly or a structure of alternating series of fabric sheets and resin layers (e.g., mixtures of resins and other ingredients).

The functional layer(s) may include one or more of the following strata: a water-repellent stratum, an anti-corrosion stratum; a visual and IR emissivity stratum, an IR blocking or partial blocking stratum, and an interface layer. Additional strata may be present to endow the functional assembly with additional or modified properties.

Thus, by stacking onto a base layer comprising a plurality of supporting material strata, e.g., fabric strata, a functional layer comprising several functional strata, a camouflage discrete unit with predefined mechanical, camouflage and stealth properties may be manufactured. These units may be tiled or assembled to a continuous camouflage surface optionally having regions of varying structural optical, visual, electromagnetic or thermal properties. Thus, a camouflage system of the present disclosure may be presented in a variety of configurations, wherein different localities along the camouflage surface exhibit different structural, camouflage, and stealth properties.

In general, most of the camouflage and stealth related attributes of a camouflage system may be implemented by a selection of materials or surface features which are part of the functional layer(s). The functional layer may include the entire external surface of the object by forming a coat on a base layer that may be attached directly to the external surface of the object. The functional layer may be constructed of a set of strata in which the features are spatially distributed, so that the camouflage attributes they implement are spatially adapted to optimize the camouflage performance of each section of the camouflaged object. In both the exoskeleton and mosaic configurations (sometimes referred to as the exoskeleton assembly and mosaic assembly, respectively) the functional layer may be supported by the base layer that provides its physical (rigid) chassis.

For both configurations disclosed herein, the coating may include a composite derived from an assembly of material components which include one of the following two combinations:

Combination A:
- an infrared (IR) blocking material,
- a fabric and resin composite material,
- a visual and/or IR emissivity material,
- an anticorrosion material; and
- a water repelling material.

Combination B:
- an IR blocking material,
- a first fabric and resin composite material,
- an insulation layer,
- a second fabric and resin composite material,
- a visual and/or IR emissivity material,
- an anticorrosion material; and
- a water repelling material.

Various configurations of a camouflage systems of the present disclosure may include the above combination of materials, wherein the order of layers of the various materials may vary. Any region of the surface of the 3D object may be coated or associated with a camouflage system or cover which composition and layer order may be different, hence providing a region-specific camouflage profile. As demonstrated by the addition of a material layer in Combination B above, as compared to Combination A, camouflage systems of other combinations may also be formed. The presence or absence of one or more material layers, the sequence of layering, and other factors relating to the process of constructing the camouflage system, e.g., how the layers are formed, the thickness of each layer, etc., may depend on the camouflage profile selected for a particular section or region of the 3D object external surface.

To form each segment in the exoskeleton configuration, a contour map of a section of the object the segment is designed to cover may be used to construct a mold having an inner structure that follows the external 3D shape/contour of the section or an external region thereof.

The particular shape and features of the section or external region and the particular area of the object the section or external region occupy may determine a camouflage profile which may dictate the selection of material components used for manufacturing the composite material to associate with that section or external region. The components of the composite material making up the segment's base layer and the functional layer may be positioned/layered onto the internal surface of the mold, and may subsequently be fused together to provide the fused composite exoskeleton segment.

In the mosaic configuration, the composite material making up the base layer and the functional layer of the tiles (i.e. mosaic pieces) may be first layered onto a hard support board, e.g., made of aluminum, and may be fused together to form a 3D composite board. The 3D composite board may be lifted off the support board and then cut into different shapes and sizes to form the individual tiles (i.e., mosaic pieces).

Note that in some configurations of the exoskeleton configuration, the anticorrosion layer and the water repelling layer may be sprayed on the segments after the segments are lifted off the mold. Similarly, in some configurations of the mosaic configuration, the anticorrosion layer and the water repelling layer may be sprayed onto the fused layers while they still reside on the support board, before the support board is cut into the individual units.

Each of the materials making up the composite segment or tile may be applied by painting, spraying, plastering, pasting, layering or any other means.

In a process for making a composite segment according to the present disclosure, the mold surface may be first covered with a sacrificial interface layer that assists in lifting off the finished segments or tiles from the mold or support board, respectively. The sacrificial or interface layer may be made of wax or a different material as listed in Table 1. Once the molded segment is lifted off and ready for assembly on the surface of the object, the interface layer may be peeled off. By peeling off the layer, the IR blocking material or layer may be endowed with a surface roughness that increases, modulates, or improves the IR blocking capabilities of the composite.

Thus, in some embodiments, the interface layer is configured to endow the IR blocking material or layer or component with surface roughness that may increase or modulate or improve the IR blocking capabilities of the composite.

TABLE 1

Exemplary materials of a sacrificial interface layer in accordance with the present disclosure.

| No. | interface layer material |
|---|---|
| 1 | Peel ply |
| 2 | Release films perforated |
| 3 | Release film non-perforated |
| 4 | Breather/bleeder |
| 5 | Vacuum bags |
| 6 | Sealant Tapes |

The IR blocking layer may be formed of a film or a metallic layer that prevents thermal radiation at IR wavelengths emitted by the object from being detected by an IR detection means such as an IR (thermal) camera. The metallic paint forming the metallic layer may be made of a colloidal solution of organic or water-based solvents containing a suspension of metallic particles. The metallic particles may be made of a metal such as copper, silver, aluminum, titanium, or iron, or may be made of carbon. The metallic paint may be deposited on the fabric and resin layer or directly on the insulation layer, in cases the insulation layer is included in the camouflage coating.

In some embodiments, the IR blocking layer or component may be configured to prevent thermal radiation at IR wavelengths emitted by the object from being detected by an IR detection means such as an IR (thermal) camera.

In some embodiments, the IR blocking layer or component may be configured to at least partially block an object IR radiation in a spectral bandwidth ranging between short infrared (between 700 nm and 3 μm) to far infrared (between 15 μm and 1 mm).

In some embodiments, the IR spectral bandwidth is between 3 μm and 8 μm or between 8 μm and 15 μm or between 15 μm and 1 mm.

In some embodiments, IR blocking may be provided by way of a metallic paint or a metallic layer including a colloidal composition of metallic particles, which in some configurations may be made of a metal such as copper, silver, aluminum, titanium, or iron, or oxides or complexes thereof, or may be made of carbon allotropes such as carbon nanotubes (CNTs), CNT-based materials, graphene, and/or graphene-based materials, etc.

In some embodiments, the metallic paint or metallic layer may be provided by deposition of metallic particles on a fabric/resin layer or directly on an insulation layer or component, in cases the insulation layer is included in the camouflage coating.

Some non-limiting examples of particles suitable for use in constructing the IR blocking layer include particles made of carbon nanotube (other than CNTs), CNTs, graphene, carbonyl iron, zinc oxide, micro-balloons, fiber chops, Aerocell (a material comprising epoxy, glass and polyester chops), and metallic particles such as nickel, copper, tin, chromium, silver, gold, titanium, zinc aluminum and others. These particles may be mixed in resins to form IR layer materials as shown in Table 2 and applied on the interface layer and/or the insulation layer.

In some embodiments, the IR blocking layer may include or be made of particulate materials such as fiberglass pieces, fiber chops, glass micro-balloons, and flakes of carbon nanotube fabric.

TABLE 2

Exemplary materials used in IR layers according to the present disclosure.

| No | Name of IR Layer Material |
|---|---|
| 1 | PPG Metallic Tones Paint |
| 2 | Tambour Silver Poliur |
| 3 | Tambour Metal Touch |
| 4 | Rustoleum Metallic Accents |
| 5 | Eastwood Metallic Single Stage Paint |

The fabric and resin composite materials used in both Combinations A and B above are components of the base layer of segments and tiles in the exoskeleton and mosaic configurations. The combination of fabrics and resins endow the base layer with its structural related features. The fabric and resin layers may include a series of fabrics laid one upon the other with a mixture of resin and particles of special ingredients used as the adhesive interlayers.

In some embodiments, the assembled array of one or more discrete camouflage units or each of the camouflage units, independently of the other, may include one fabric and resin layer, as in Combination A above (a single fabric and resin layer combination), whereas in other embodiments, as exemplified by Combination B above, two or more such layers (first and second fabric and resin layer combinations) may be provided, separable by an insulation layer.

Non-limiting examples of resins include epoxy resin, polyester resin, Gelcoat resign (an epoxy or a polyester with wax resin), vinyl ester resin, phenolic resin, and polyurethane.

As noted, the fabric and resin layer(s) or combination, as depicted for Combinations A and B above, may be deposited on top of the IR blocking layer to support the functional layers or materials that are associated therewith. In other words, the fabric and resin layers may constitute a second substrate that supports the films and strata.

Non-limiting examples of fabrics and resins that may be used are provided in Tables 3A-C.

TABLE 3A

Fabrics used in some embodiments of composite materials of the present disclosure.

| No. | Name of Fabric | Description | Manufacturing system |
|---|---|---|---|
| 1 | KEVLAR | K29/49 | Woven/multiaxials/Unidirectional |
| 2 | E-glass | different styles | Woven/multiaxials/Unidirectional/ chopped fibers mat |
| 3 | S-glass | different styles | Woven/multiaxials/Unidirectional |
| 4 | carbon | 1K/3K/6K/ 12K/24K | Woven/multiaxials/Unidirectional |
| 5 | basalt | basalt fibers | Woven/multiaxials/Unidirectional |
| 6 | hybrids | carbon/kevlar etc. | Woven/multiaxials/Unidirectional |
| 7 | Boron | | Woven/multiaxials/Unidirectional |
| 8 | ceramics | | Woven |
| 9 | finishmat/veil | | Nonwoven |

TABLE 3B

Examples of resins used in composite materials of the present disclosure.

| No. | Resin |
|---|---|
| 1 | Epoxy |
| 2 | Polyester |
| 3 | Gelcoat |
| 4 | Vinyl Ester |
| 5 | Phenolic |
| 6 | Polyurethane |

Some examples of particles mixed with resins used in the fabric and resin layers are given in Table 3C.

TABLE 3C

Examples of particles used in composite materials of the present disclosure.

| No. | Particles |
|---|---|
| 1 | Reflective metal flaks RMF-AM1 |
| 2 | Carbon nanotube |
| 3 | Graphene |
| 4 | CNT |
| 5 | Carbonyl iron |
| 6 | Zinc oxide |
| 7 | Micro-balloons |
| 8 | Fiber chops |
| 9 | Aerocell-a material comprising epoxy, glass and polyester chops |
| 10 | particles & metal chops |

An insulation layer may be included to provide extra insulation to the external surface of the camouflage system. It is generally assumed that the internal temperature of the object is higher than the temperature of the surrounding environment. Hence the heat generated by the object flows towards the external surface of the camouflage coating or cover by conduction and convection, raising its temperature which intensifies the "thermal" IR emitted by the camouflaged object. This causes the thermal signature of the object to be more conspicuous. In order to reduce the effect of this heating, the camouflage coating may be insulated from the object. This may be done by the fabric and resin layer. In some embodiments, the insulation layer is provided underneath the external or topmost layer(s). In other embodiments, the insulation layer may be provided on the surface of the object.

In other embodiments, the insulation layer is configured to at least prevent heat emitted by the object from flowing towards the external layers of the camouflage cover or composite. In some embodiments, the insulation layer is positioned and configured to at least partially prevent heat emitted by the object from flowing towards the emissivity layer.

Thus, in some embodiments, in the assembled array of one or more discrete camouflage units or in each of the camouflage units, independently of the other, the fabric and resin combination may be configured to reduce or eliminate flow of thermal energy, e.g., heat, generated by the object from flowing towards the external surface of the camouflage coating or cover, e.g., by conduction and/or convection.

In some embodiments, an insulation layer may be additionally used where, for example, the internal temperature of the object is very high (e.g., if the camouflage object is a vehicle with an internal combustion engine), or where extra insulation may be needed. In such cases, in the assembled array of one or more discrete camouflage units or in each of the camouflage units, independently of the other, an insulation layer is configured to reduce or eliminate flow of thermal energy, e.g., heat, generated by the object from flowing towards the external surface of the camouflage coating or cover, e.g., by conduction and/or convection.

The insulation layer may be constructed of an insulating material. Examples of insulating materials are listed in Table 4 below. The insulating material may be sandwiched between two layers of fabric and resin.

TABLE 4

| Examples of insulation components used according to the present disclosure. | |
|---|---|
| No. | Materials Insulation layer |
| 1 | Divinycell ®-A PVC foamed material |
| 2 | Honeycomb-Aluminum, fiberboard, fiberglass |
| 3 | Basalt fibers |
| 4 | Foamed Polystyrene |
| 5 | Coremat |

Camouflage systems and covers that include an insulation layer may also include a second fabric and resin layer (e.g., Combination B), so that the insulation layer bridges between two fabric and resin layers which serve as mechanical support to the insulating material.

The details of this layer may be identical to the first fabric and resin layer given above. The composition of this layer may thus include any of the examples relating to and described in Table 3A-C.

In some embodiments, the assembled array of one or more discrete camouflage units or each of the camouflage units, independently of the other, may include a visual and IR emissivity layer that is configured to spatially modulate emissivity in the visual and IR (thermal) wavelength ranges. This layer may include a collection of films of different colors that are painted on top of the IR blocking layer and laterally distributed as a collection of pigmented patterns. The combination of patterns may impart the coating with an external emissivity that substantially mimics, both geometrically and spectrally, the typical emissivity (at the visual wavelengths) of the object background in the theater of operation for which the system is made. This layer may also include patterns of metallic paint similar to the metallic paint used for the IR blocking layer so that the IR component of the ambient illumination that is incident on the object is scattered and reflected similar to its scattering and reflection by the background.

Some non-limiting examples of pigment materials which may be used for forming the patterns are provided in Table 5.

TABLE 5

| Pigment materials used according to the present disclosure. | |
|---|---|
| No. | Name of Material of the Emissivity Layer |
| 1 | Dulux Easycare |
| 2 | PPG SPEEDHIDE Interior Latex |
| 3 | PPG TIMELESS Interior Paint |
| 4 | Sherwin-Williams ® Ultra 7000 ® |
| 5 | Sherwin-Williams ® Acry Glo |
| 6 | Rustoleum Ultra Cover |
| 7 | Rustoleum 3700 System DTM Acrylic Enamel |
| 8 | Tambur Monocoat F.D |
| 9 | Tambur Tamagaurd EN-80 |

The anticorrosion layer may include an anticorrosion varnish that aims at extending the durability of coating materials such as metallic materials for outdoor operation at extreme weather conditions. Some non-limiting examples of anticorrosion materials are provided in Table 6.

TABLE 6

| Anticorrosion materials. | |
|---|---|
| No | Name of Material |
| 1 | Sikagard ® Hygienic Coatings |
| 2 | Sikafloor ® Marine Primer |
| 3 | Sikagard ®-6440 S |
| 4 | Sika ® Primer-210 |
| 5 | SPI SP Liquid Membrane |
| 6 | SPI Rust Grip |
| 7 | Tambur SSPC |
| 8 | Tambur HS-810 |

The water repelling layer may be made of a transparent water-repelling paint selected for reducing water absorbance by the layers of the assembly, and for reducing IR reflection and scatter from a wet external surface of the coating due to the high emissivity of water at the relevant IR wavelengths. Some non-limiting examples of water repelling materials are provided in Table 7.

TABLE 7

| Water repelling materials. | |
|---|---|
| No. | DWR Resin Name |
| 1 | Epoxy |
| 2 | Polyester |
| 3 | Gelcoat-An epoxy or a polyester with wax |
| 4 | Vinyl Ester |
| 5 | Phenolic |
| 6 | Polyurethane |

The composite structure constituting a segment of the camouflage system according to the present disclosure may be formed in a pre-shaped mold by spraying, brushing, painting, printing, pasting, plastering, etc., the materials disclosed herein, in a sequence selected to endow the segment molded with a predetermined set of camouflage properties. Thus, a method for manufacturing a composite segment of a camouflage system as disclosed herein, or for manufacturing a plurality of segments each having a predetermined camouflage property, as defined herein, and used according to aspects and embodiments of the present disclosure, may include:

layering one or more material components in a mold structure having an inner cavity shaped and sized to correspond to a shape and size of a section of an external surface of the object the segment is designed to cover, or a shape and size of an object the segment is designed to replace, wherein a selection of the one or more material components and the layering sequence determines the segment camouflage property and applying conditions to said layered material components in the mold structure to form the segment comprising a composite material having the shape and size corresponding to the external surface of the object the segment is designed to cover or replace.

In some embodiments, the process may include coating or associating the external surface of the object with the segment(s).

In some embodiments, the process may include obtaining a mold structure having an inner cavity shaped and sized corresponding to a shape and size of a section of an external surface of the object the segment is designed to cover.

In some embodiments, the process may include manufacturing the mold based on a contour map of the object.

In some embodiments, the process may include obtaining, measuring, or determining a contour map of the object.

In some embodiments, the conditions applied to the layered materials in the mold structure to form the segment may include applying a compression force to the materials in the mold. In some embodiments, the compression force may be in the range of 30 kg to 50 Tons per square inch.

In some embodiments, the conditions may include raising the temperature in the mold to a temperature above room temperature (23-30° C.). In some embodiments, the mold may be treated at a temperature between ambient temperature and 180° C.

In some embodiments, the conditions may include raising a pressure above ambient pressure. In some embodiments, the pressure may be between (−1) bar (vacuum) and 10 bars. Other conditions are dependable on the materials used in the production.

Aspects of the present disclosure further provide a method of manufacturing camouflage system for an object comprising an assembled array of one or more discrete camouflage units or of assembling an array of one or more discrete camouflage units (i.e., segments or tiles) on an object, wherein each of the one or more discrete units has at least one predetermined structurally related property and at least one camouflage-related and or stealth-related property. The method may include assembling a plurality of the discrete units onto a region of an external surface of the object, wherein each of the plurality of the discrete units has at least one structural property that may be configured to intimately fit a surface detail locality and may be laterally positioned to endow the surface locality with at least one camouflage-related and or stealth-related property; and may join a plurality of neighboring discrete units to provide a laterally continuous camouflage system.

In some embodiments, the discrete units may be pre-shaped and sized to fit a surface contour of a section of the camouflaged object.

In some embodiments, the discrete units may be flexible tiles that are configured to affix to the surface of the object, thereby fitting a surface contour.

In some embodiments, each of the discrete units may include a functional layer comprising a plurality of strata.

In some embodiments, each of the discrete units may be constructed of a base layer and a functional layer.

In some embodiments, each segment or tile may be attached to each other and/or to a surface region of the object by use of an adhesive, namely by gluing the segments or tile to the surface; by attaching to the surface by Hook and Loop fasteners (Velcro® fasteners), which may be pre-glued to the segment inner surface and to the surface of the object; by magnetic elements or by any other means.

Another unique feature of the technology disclosed herein is to provide an object or a functional element of an object that is intended to replace the object or functional element and which may be composed of a composite material according to the present disclosure, wherein the object or the functional element is provided with the camouflage properties disclosed herein. In other words, unlike other aspects of the disclosure, the objects or functional elements are not coated or associated with an exoskeleton or tile but rather structured of the composite material. The object may be any object for which concealment is desired. The functional element may be any part of the object to be concealed or protected from detection. The functional element may be a vehicle door, a wing, wheel covers, and others.

Thus, aspects of the present disclosure include a method for manufacturing a replacement 3D object (being a section or a part that replaces the respective original part of an object and is integrated with a coating that bares a camouflage pattern), the method including layering of materials to form a composite structure and forming the composite structure in a mold structure having an inner cavity being of a shape and size based on the replacement object.

Aspects of the present disclosure may further include a kit including a plurality of discrete camouflage units, each of the discrete units being of a composite material, as disclosed herein, having at least one predetermined structurally related property and at least one camouflage-related property, and wherein each of the discrete units is provided with an attachment element configured to attach to another of said units; and instructions of use.

The discrete units in a kit of the present disclosure may be structured to provide a camouflage system or cover as defined herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

(FIG. 1B) the assembled exoskeleton.

DETAILED DESCRIPTION

Figure 1A:
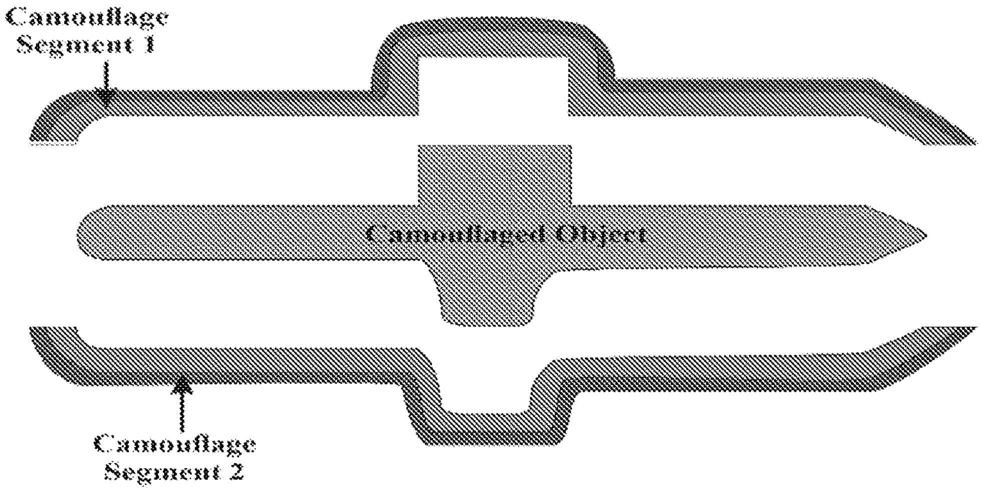
FIGS. 1A-B provide schematic illustrations of (FIG. 1A) an exoskeleton assembly comprising two camouflage segments that are structured to fit an external surface region of an object, and together to assemble into the camouflage system.
Figure 1B:
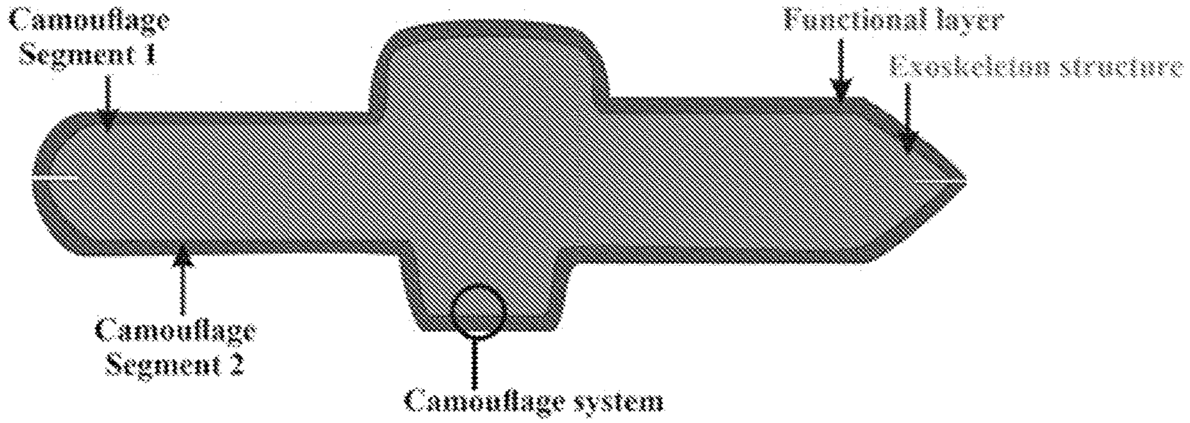

In the exoskeleton configuration, the camouflage system may be constructed of a set of segments that are assembled together to form the complete camouflage system or cover. A schematic illustration of a system divided into two segments is illustrated in FIGS. 1A and B. As illustrated, each of the two segments is structured to fit external surface features of the object to be camouflaged. The structure and shape, as well as the material composition making each of the two segments may be different. While 2 segments are depicted in FIG. 1A and FIG. 1B, other implementations of the exoskeleton structure may include any number of segments.

Independent of the number of segments, each segment may be built to fit the contour map of the respective section of the object it is intended to cover. Each of the segments may be constructed of two components—the base component and the functional component. These two components may be joined together by a layer of a resin. Each of the segments may be distinct in its predetermined structurally related properties, e.g., composition, shape and size, such that the assembly of the segments provides a continuous camouflage cover.

Figure 2:
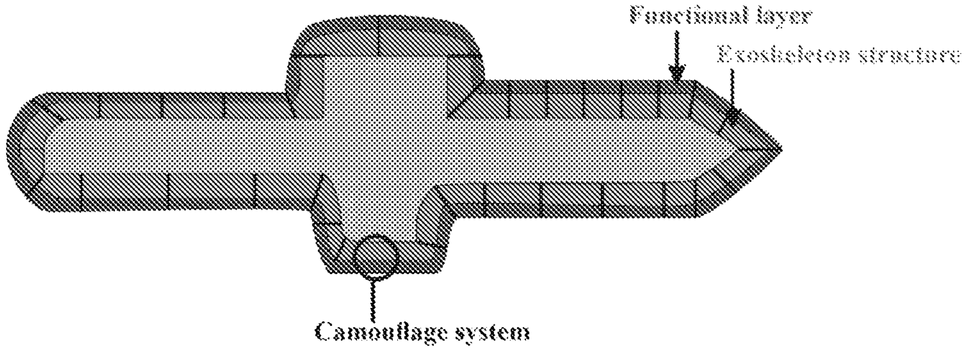
FIG. 2 provides a schematic illustration of a mosaic assembly comprising a plurality of tile units laterally assembled to provide the camouflage system.

Each of the segments may also be appended with at least one predetermined camouflage-related property that results from the stacking of selected layers making up the segments. When the segments are placed on top of the object and joined together to provide the camouflage cover (e.g., as shown in FIG. 1B for the exoskeleton configuration and in FIG. 2 for the mosaic configuration), their functional components may together constitute one functional layer that covers the entire surface of the object, or at least a portion of the surface of the object. The base components of the segments may serve as a physical chassis for the functional layer and may also provide thermal insulation for the functional layers from the heat that flows from the object. The base components may be locally adapted to the sections of the object they are built to cover.

Figure 3:
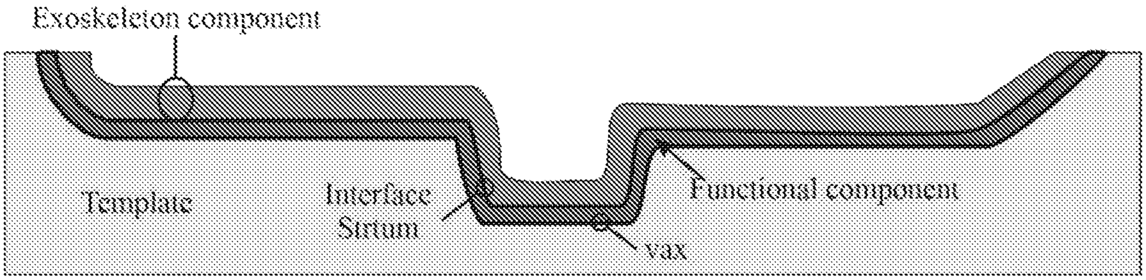
FIG. 3 depicts layering of the base and functional layers within a mold structure according to an exoskeleton configuration.

Typically, the segments may be formed in a mold or a template, as shown in FIG. 3. The exoskeleton components may be constructed of a series of fabric sheets that may be fused together by a mixture of resin or epoxy with special ingredients. The mixture is pasted between the fabric sheets. The fabric sheets may serve as scaffolding for a mixture of a resin/epoxy with special ingredients that is sandwiched between them, and through a hot-pressing process combine them into one entity. Selecting the kinds of sheets from which each segment of the exoskeleton is made and choosing the composition of the mixture of the resins with the different ingredients that is sandwiched between the sheets, enables different segments of the exoskeleton to be imparted with a different set of attributes as needed for the specific section of the object where it is planned to be used.

Figure 4A:
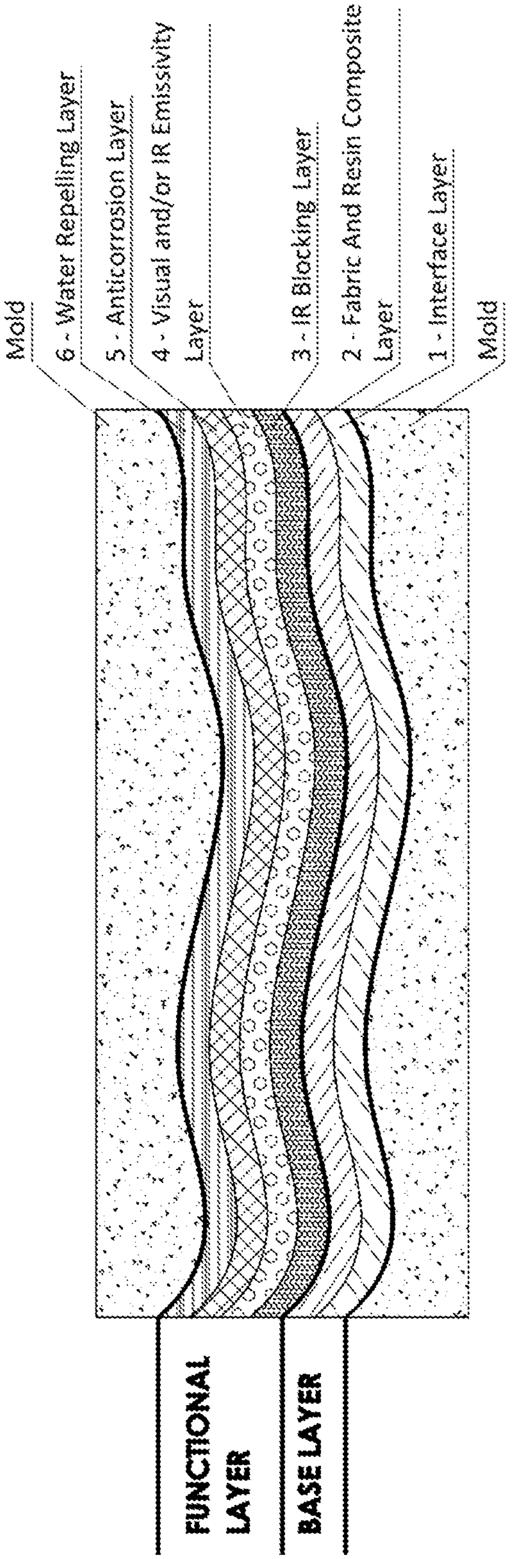
FIGS. 4A-B provide a depiction of two different layer combinations of structural and functional layers within a mold structure according to some aspects of the present disclosure.
Figure 4B:
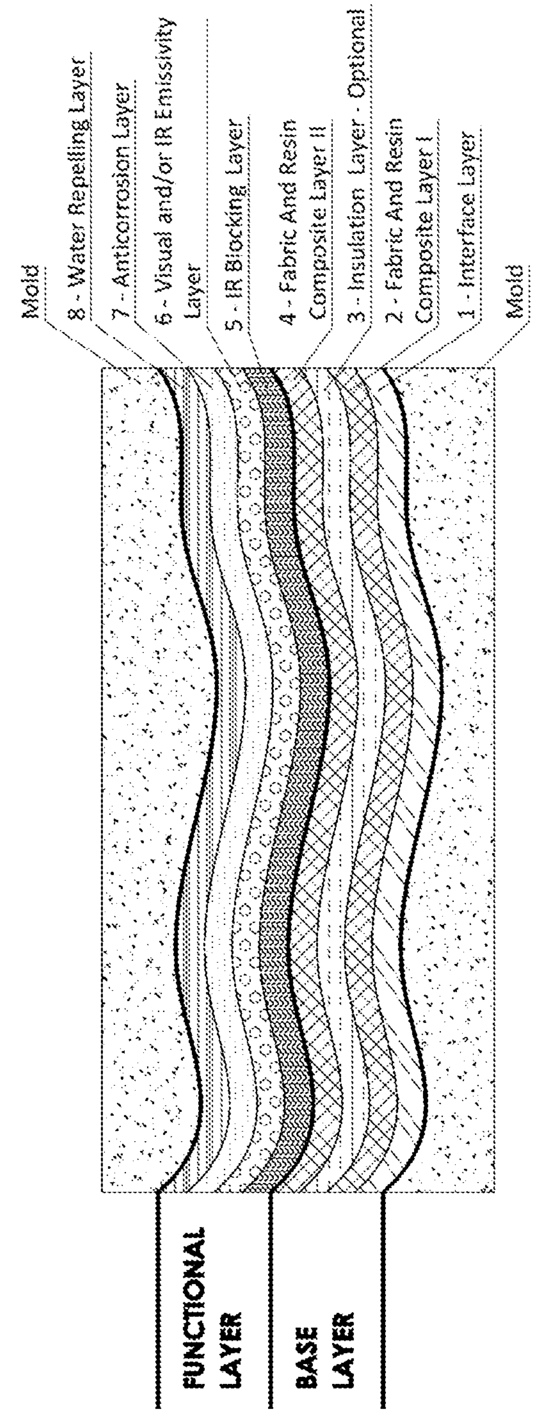

The functional components of the segments may constitute an interface between the system and the environment in which it operates. The camouflage performance of the system may be determined by the camouflage and stealth related features of the functional layer, as disclosed herein. These features may be implemented by a set of strata or layers that are deposited one on top of the other and constitute together the functional layer, as depicted in FIGS. 4A-B.

Note that the functional component may also exhibit features that are not camouflage or stealth related, such as by including an anticorrosive layer that shields the system from corrosive interaction with the environment in which it operates. The anticorrosive layer may allow for extending operability lifetime of the system. When the different segments of the system are assembled to form the system, the functional components of the various segments may form together one functional layer that covers the entire surface of the object.

The exoskeleton component may provide both the structural chassis for the functional component, and thermal insulation that prevents the functional component from being heated by the heat that flows by conduction from the camouflaged object towards the external surface of the camouflage system, of the exoskeleton component may include a series of fabric sheets that are spread with resin/epoxy that is mixed with special ingredients. The sheets may be of different kinds in order to enhance specific attributes to the section of the system for which the segment is built. One example is to use Kevlar sheets that attribute bulletproof capabilities. As pointed out above, each sheet may be spread with a mixture of resin or epoxy mixed with ingredients such as pieces of fiberglass, and/or fiber chops, and/or micro-balloons to enhance their strength and attribute the sheets with heat resistance. The first sheet may be placed on top of the interface stratum of the functional layer and may then be spread with a resin/epoxy paste mixed with special ingredients which include fiberglass pieces, and/or fiber chops, and/or glass micro-balloons, and/or flakes of carbon nanotube fabric. The next sheets may then be placed one by one on top of each other with the mixture of resin/epoxy with the additional ingredients sandwiched between them. In the process of pressing the sheets to become one fused component, the resin mixture may penetrate and soak adjacent sheets between which it is spread, such that excess resin mixture may remain sandwiched between.

In the exoskeleton configuration the system may be constructed of a set of discrete segments. Each segment may be fabricated individually with a specific set of features (both functional and structural) that are tailor-made for making the segment performance optimal for the section of the object for which it is built. Upon their completion, each segment may be attached to its respective section in the object, and fused with its adjacent system segments, forming together the complete system.

General Description of the Fabrication Process of Segments in the Exoskeleton Configuration:

Each segment may be made using a metallic template with internal contour map that fits the section of the object for which the segment is built. The template may serve as a mold into which the segment is fabricated.

Prior to the commencement of the fabrication process, the template may be pasted with a thin layer of wax in order to facilitate the lift-off the segment from the mold at the end of the process. The segment fabrication process may constitute a series of consecutive steps in which it is built layer by layer, one on top of the other. The inner surface of the template may be imparted with roughness that is transported to the external surface of the segment (i.e. to the external surface of the functional component of the segment). The texture and level of roughness may be set individually to each segment, in order to determine the required balance between the diffusive scattering and the specular reflection of the light that is incident on the segment.

The first phase of the process may include deposition of the strata that constitute the functional component of the segment that is being built. The strata may be deposited on the inner face of the metallic template in reverse order (i.e. the deposition of the outer-most stratum first, etc.). Once these strata are deposited, they may be pasted with an additional stratum made of resin mixed with the said special ingredients that serves as the interface between the functional component and the exoskeleton component of the segment.

The second phase of the segment fabrication process may constitute construction of the exoskeleton component of the segment. This may be achieved by laying layers of fabric sheets that are pasted with resin mixed with special ingredients, so that the end result is a structure built of an alternating series of fabric sheets with mixtures of resin and the special ingredients sandwiched between them.

Following the fabrication of the functional layer and laying the fabric sheets and resin/epoxy spreads that are sandwiched between them, the entire segment and template may undergo a hardening process by the application of pressure at a high temperature. This stage may be achieved under vacuum conditions that cause the cleansing of extra vapors and volatile substances that reside in the resin/epoxy, or fluids used for introducing the additional ingredients to the mixture.

In an alternative realization of the exoskeleton configuration, the exoskeleton may be constructed of a single thick layer made of a mixture of the resin/epoxy with pieces of fiberglass, chopped fiber and/or glass micro balloons. The typical thickness of the single layer exoskeleton is 1 cm.

The camouflage system in the exoskeleton configuration may be assembled segment by segment by attaching each individual segment to its location on the respective section of the system. The segments may be attached to their locations by employing one of three techniques: (i) the segments may be permanently glued to their location on the surface of the section for which they are built; (ii) the segments may be attached to the respective system section by Hook and Loop fasteners (Velcro® fasteners) which may be pre-glued or pre attached or pre associated to the segment inner surface and the matching (opposing) external surface of the section; or (iii) the segments may be attached to the respective system section by magnetic flexible surfaces that were pre-glued to the segment inner surface and the matching external surface of the section.

Special care may be given to the design of the segment perimeter, so that the outlines of adjacent segments match accurately. In some cases, the edges of adjacent segments may overlap to blur the visibility of the outlines.

In the mosaic configuration the system may be constructed of tiles which are assembled together as a 3D mosaic attached to the external surface of the camouflaged object, roughly in the shape of the contour map of the latter. Each tile may be constructed of two components, the base component and the functional component. The base component may provide the physical chassis to the functional component, and additionally may insulate the functional component from the heat generated by the object and flows by conduction and convection to the external surface of the functional unit. Both components may be joined together to form one unit which is the tile. The tiles may serve as mosaic pieces that are attached on top of the external surface of the object. Their structure and fabrication options may be similar to that of the segments in the exoskeleton configuration. The tiles may be cut in different shapes and sizes from large planar sheets manufactured on top of aluminum support boards. The sheets may be fabricated by a process that resembles the fabrication process of the segments of the exoskeleton assembly described above.

It will be appreciated that the embodiments described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A system comprising:

a multispectral camouflage covering comprising:

a first camouflage tile having a first camouflage profile and first plurality of layers comprising:

a first visual layer having a first visual profile; and a first infrared blocking layer having a first infrared profile, the first camouflage profile comprising: the first visual profile, the first infrared profile, and a first radar profile; and a second camouflage tile having a second camouflage profile and a second plurality of layers comprising:

a second visual layer having a second visual profile that differs from the first visual profile; and a second infrared blocking layer having, a second infrared profile that differs from the first infrared profile, the second camouflage profile comprising: the second visual profile, the second infrared profile, and/or a second radar profile that differs from the first radar profile, the second camouflage tile being laterally joined with the first camouflage tile, and the multispectral camouflage covering configured to cover at least a portion of an object.

2. The system according to claim 1, further comprising the object having the multispectral camouflage cover fitted thereto.

3. The system according to claim 1, wherein the first camouflage tile comprises a shape and a size that are each selected so as to intimately fit a surface section or detail of an external surface of the object.

4. The system according to claim 1, wherein the first camouflage profile provides one or more of: (a) emissivity at visual and infrared (IR) wavelengths, (b) IR blocking for adjusting the IR emitted by the object, (c) a ratio between scattering and specular reflection of light incident on an external surface of the object, and (d) a stealth-related property associated with absorption of radar beams incident on the object, and diversion from being reflected back towards a source of the radar beams.

5. The system according to claim 1, wherein the first camouflage tile includes a segment having an inner surface configured to fit a shape or a size of an external surface section of the object.

6. The system according to claim 1, wherein the first camouflage tile includes a tile of a random shape and size.

7. The system according to claim 6, wherein the first plurality of layers includes at least one base layer and at least one functional layer, wherein the at least one functional layer comprises the first visual layer and the first infrared blocking layer.

8. The system according to claim 7, wherein the at least one base layer and the at least one functional layer are each independently formed of stacked material layers.

9. The system according to claim 7, wherein the at least one functional layer further comprises one or more of: a water-repellent layer, and an anti-corrosion layer.

10. The system according to claim 9, wherein the at least one base layer comprises an insulation layer.

11. The system according to claim 10, wherein the at least one base layer further comprises: a first fabric and resin composite layer, and a second fabric and resin composite layer, wherein the insulation layer is positioned between the first fabric and resin composite layer and the second fabric and resin composite layer.

12. A system comprising:

a multispectral camouflage covering comprising:

a first camouflage tile having a first camouflage profile and a first plurality of layers bonded together to form a first shape, the first plurality of layers comprising:

a first visual layer having a first visual profile; and a first infrared blocking layer having, a first infrared profile the first camouflage profile comprising: the first visual profile, the first infrared profile, and a first radar profile; and a second camouflage tile having a second camouflage profile and a second plurality of layers bonded together to form a second shape, the second plurality of layers comprising:

a second visual layer having a second visual profile that differs from the first visual profile; and a second infrared blocking layer having, a second infrared profile that differs from the first infrared profile, the second camouflage profile comprising: the second visual profile, the second infrared profile, and a second radar profile that differs from the first radar profile, wherein the second camouflage tile is laterally joined with the first camouflage tile, with the first shape and the second shape corresponding to a respective shape of an external surface of an object.

13. The system according to claim 12, wherein the first camouflage tile and the second camouflage tile are fixed together to provide a composite camouflage segment.

14. The system according to claim 12, wherein each discrete camouflage unit, of a plurality of discrete camouflage units comprising the first camouflage tile and the second camouflage tile, is laterally joined to one or more neighboring discrete camouflage units to form a continuous camouflage cover configured to fit to a contour of an external surface of the object and to conceal the object from visible detection, infrared detection, thermal imaging, and radar detection.

15. The system according to claim 12, wherein the first plurality of layers further comprises at least one of: a water-repellent layer, an anti-corrosion layer, or an insulation layer.

16. The system according to claim 12, wherein the first plurality of layers further comprises a water-repellent layer, an anti-corrosion layer, and an insulation layer.

17. The system according to claim 1, wherein the multispectral camouflage covering is configured to fully coat an external surface of the object.

18. The system according to claim 1, wherein the multispectral camouflage covering further comprises a plurality of additional camouflage tiles different from the first camouflage tile and the second camouflage tile.

19. The system according to claim 1, wherein the first plurality of layers further comprises a plurality of alternating fabric layers and resin layers.

20. The system according to claim 1, wherein the first camouflage tile further comprises a first fabric and resin composite layer comprising a surface contacting the first infrared blocking layer.

* * * * *